Patented Oct. 21, 1924.

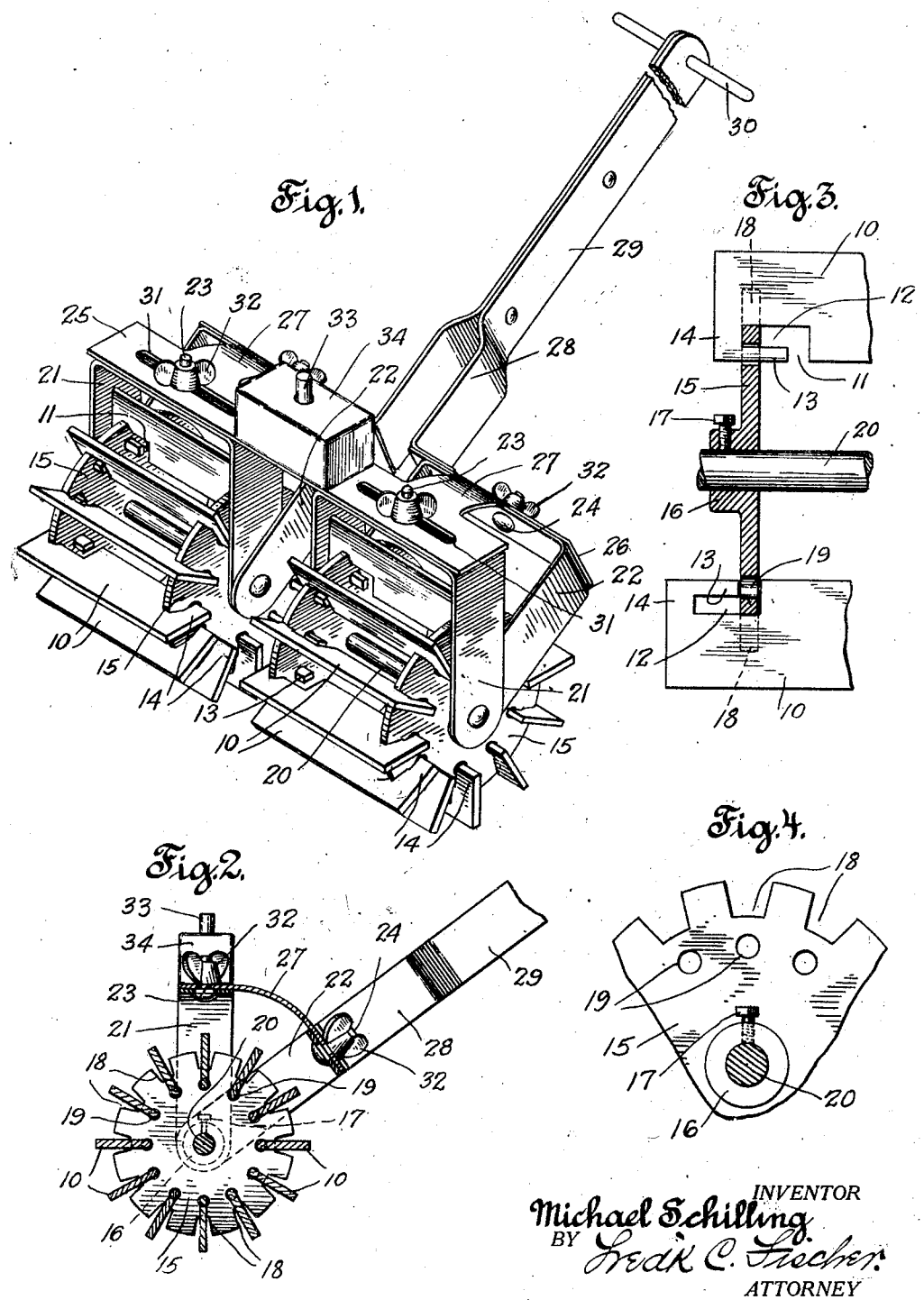

1,512,502

UNITED STATES PATENT OFFICE.

MICHAEL SCHILLING, OF RAHWAY, NEW JERSEY.

ROTARY HOE.

Application filed May 4, 1922. Serial No. 558,405.

*To all whom it may concern:*

Be it known that I, MICHAEL SCHILLING, a citizen of the United States, residing at Rahway, county of Union, and State of New Jersey, have invented certain new and useful Improvements in Rotary Hoes, of which the following is a specification.

The invention relates to that type of implements used in tilling the soil between rows of growing plants and has as one of its objects to provide a hand operated cultivator adapted to stir the surface of the soil and extirpate the weeds on both sides of a row of growing plants simultaneously.

A further purpose is to produce a duplex implement in which the rotatably mounted cultivating elements are adjustably distanced within a frame or yoke, thus enabling the use of the same on rows of thin and slender growing plants or those of a more mature bushy nature.

Another aim is in the provision of a cultivating implement having loosely but securely mounted blades arranged in a novel manner and provided with adjustable means for compelling their entrance into the crust of the soil.

These and other like objects, which will become apparent as the description progresses, are attained by the novel construction, combination and arrangement of parts hereinafter described and shown in the accompanying drawing, forming a part of this disclosure, and in which:—

Figure 1 is a perspective view showing an approved embodiment of the invention.

Figure 2 is a transverse sectional view taken through one of the cultivating units.

Figure 3 is an enlarged fragmentary longitudinal sectional view showing the manner in which the blades are secured to their supports.

Figure 4 is a fragmentary side view of one of the supports in detail.

Stated in general terms the invention comprises a pair of cultivator units arranged side by side and so mounted in a yoke-like frame that they can be adjusted towards or from each other, the frame being provided with a tongue adapted to be manually operated.

Each of the blades is pivotally mounted at both ends in rotatable disc supports in such manner as to be free to move limitedly in the soil and weights are provided to force the blades into the soil sufficiently to accomplish their purpose.

Referring now to the drawing, the numeral 10 designates in general one of the scarifying blades which, as will be seen, are essentially oblong rectangles in shape, made preferably of sheet steel of suitable thickness.

Extending in from one edge, adjacent each end, are openings 11 terminating in longitudinal recesses 12, thereby forming arms 13 of parallel width, joined by shoulders 14 to the body of the blades.

The supports for the blades consist of paired discs 15 having bored hubs 16 provided with set screws 17 or equivalent fastening means and contain in their peripheries a plurality of evenly spaced notches 18 having flat bottoms slightly in excess of the width of the blades and angular side edges as shown.

An annular row of circular openings 19 are formed through the discs in register with the notches, spaced uniformly from their bottoms, said openings being receptive of the arms 13 while the body of the blades 10 rest in the notches and may contact with either angular edge as the implement is operated, being free to swing on the arms which constitute pivots.

Said discs and blades are easily assembled and the blades may be arranged parallel to the axis of the units or, if preferred, may be held obliquely, the discs being secured rigidly in paired relation upon independent spindles 20.

Each spindle is housed at its extending ends in pairs of reversed, U shaped looped bracket elements 21 and 22, respectively upper and front, said brackets having fixed at the center of their longitudinal members studs 23 and 24.

The upper pair of brackets 21 are held in operative position by a bar 25 and a similar bar 26 connects the front brackets 24. The bars 25 and 26 are integrally connected by curved transverse elements 27 and to the outer bar 26 is engaged the spaced portions 28 of the tongue 29 provided with its handle bar 30.

Each of the bars 25 and 26 are slotted longitudinally and through these slots 31 pass the screw-threaded ends of the studs 23 and 24, engaged by the thumb nuts 32, thus clamping the blade carrier units when adjusted laterally.

Fixed in the center of the bar 25 is a post 33 adapted to pass through a hole in the weight 34 the purpose of which is to force the blades definitely into the soil and obviously the weights may be varied to suit the requirements.

The operation of assembling the blades and discs to form the cultivator units is thought to be obvious and also the means for adjusting the distance between the units.

The spaced portion 28 of the tongue permits use of the apparatus with plants of considerable height, which pass between the side elements and under the bars 25 and 26 when in operation.

Due to the peculiar mounting of the blades a shovel or hoe effect is secured which operates to loosen the soil in an effective manner, breaking the crust, forming a desirable soil mulch or dust blanket, allowing the air to penetrate and is also effectual in killing common weeds, particularly when young and without injury to the plant crop under cultivation, the implement being as easy to operate as a hand lawn mower, which in many ways it resembles.

Although the foregoing is descriptive of the preferred embodiment of the invention, it will be apparent that minor changes may be made in its construction, without the exercise of invention or conflicting with the scope of the claims hereto appended.

Having thus described my invention, what I claim as new and desire to secure by Letters Patent, is:—

1. An agricultural implement comprising a pair of revoluble units, each unit having a plurality of longitudinal blades, a pair of notched discs supporting said blades, a spindle for each pair of discs on which each disc is independently adjustably secured, brackets in which said spindles are mounted, studs fixed in said brackets, an integral barred frame engaging said brackets, the bars of said frame having slots through which said studs pass, means for securing said studs in adjustment, a hand actuable tongue co-operative with said frame, and a weight on said frame adapted to force said blades into the soil.

2. An agricultural implement comprising a pair of revoluble units, each unit having a plurality of longitudinal blades, each blade having recesses in their inner edges adjacent their ends and pivot elements extending into the recesses, a pair of discs having openings into which said pivot elements enter, means formed with said discs for limiting the pivotal movement of said blades, brackets for each unit, a manually operable frame, and co-operative means between said frame and brackets whereby the latter may be adjusted laterally to present more or less space therebetween.

3. A soil tilling device comprising a rotatably mounted shaft, a pair of discs adjustably secured to the shaft, said discs having a plurality of angular notches in its periphery and a row of openings concentric therewith, blades loosely positioned in the notches, said blades extending from one disc to the other, and past the sides thereof and opposed inreaching arms formed with said blades engaging in the mentioned openings of said discs.

This specification signed and witnessed this 26th day of April, 1922.

MICHAEL SCHILLING.

Witnesses:
FRED'K C. FISCHER,
FERDINAND NOLL.